United States Patent
Servadei et al.

(10) Patent No.: US 11,614,511 B2
(45) Date of Patent: Mar. 28, 2023

(54) RADAR INTERFERENCE MITIGATION

(71) Applicant: Infineon Technologies AG, Neubiberg (DE)

(72) Inventors: Lorenzo Servadei, Munich (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 139 days.

(21) Appl. No.: 17/024,306

(22) Filed: Sep. 17, 2020

(65) Prior Publication Data

US 2022/0082654 A1    Mar. 17, 2022

(51) Int. Cl.
| | |
|---|---|
| G01S 7/02 | (2006.01) |
| G01S 7/35 | (2006.01) |
| G01S 7/41 | (2006.01) |
| G01S 13/89 | (2006.01) |

(52) U.S. Cl.
CPC .............. *G01S 7/023* (2013.01); *G01S 7/354* (2013.01); *G01S 7/417* (2013.01); *G01S 13/89* (2013.01)

(58) Field of Classification Search
CPC ........ G01S 13/931; G01S 13/89; G01S 7/023; G01S 7/354; G01S 7/417; G06T 7/73; G06T 2207/10044; G06T 2207/20081; G06T 2207/20084
USPC .......................................................... 342/83
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,414,631 B1 | 7/2002 | Fujimoto | |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,295,154 B2 * | 11/2007 | Walton ................. | H01Q 1/3233 342/126 |
| 7,317,417 B2 | 1/2008 | Arikan et al. | |
| 7,596,241 B2 | 9/2009 | Rittscher et al. | |

(Continued)

FOREIGN PATENT DOCUMENTS

| | | |
|---|---|---|
| CN | 1463161 A | 12/2003 |
| CN | 1716695 A | 1/2006 |

(Continued)

OTHER PUBLICATIONS

"Chirp" A New Radar Technique by Donald Lancaster published Jan. 1965 Electronics World (Year: 1965).*

(Continued)

*Primary Examiner* — Erin F Heard
*Assistant Examiner* — Michael W Justice
(74) *Attorney, Agent, or Firm* — Slater Matsil, LLP

(57) ABSTRACT

In an embodiment, a method for radar interference mitigation includes: transmitting a first plurality of radar signals having a first set of radar signal parameter values; receiving a first plurality of reflected radar signals; generating a radar image based on the first plurality of reflected radar signals; using a continuous reward function to generate a reward value based on the radar image; using a neural network to generate a second set of radar signal parameter values based on the reward value; and transmitting a second plurality of radar signals having the second set of radar signal parameter values.

20 Claims, 8 Drawing Sheets

(56) References Cited

U.S. PATENT DOCUMENTS

| | | | |
|---|---|---|---|
| 7,683,827 B2 | 3/2010 | Kelly, Jr. et al. | |
| 7,692,574 B2 | 4/2010 | Nakagawa | |
| 7,768,445 B2 | 8/2010 | Inaba | |
| 7,873,326 B2 | 1/2011 | Sadr | |
| 7,889,147 B2 | 2/2011 | Tam et al. | |
| 8,228,382 B2 | 7/2012 | Pattikonda | |
| 8,259,003 B2 * | 9/2012 | Song | G01S 7/0232 342/134 |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 10,054,668 B2 * | 8/2018 | Culkin | G01S 7/2923 |
| 10,108,903 B1 * | 10/2018 | Piao | G01S 13/003 |
| 10,379,201 B2 | 8/2019 | Villeval et al. | |
| 10,670,700 B2 * | 6/2020 | McMahon | G01S 7/023 |
| 11,287,634 B2 * | 3/2022 | Yeh | G06V 20/69 |
| 2003/0102997 A1 | 6/2003 | Levin et al. | |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2011/0279307 A1 * | 11/2011 | Song | G01S 13/282 342/134 |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0219689 A1 | 8/2017 | Hung et al. | |
| 2017/0310758 A1 | 10/2017 | Davis et al. | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0081030 A1 * | 3/2018 | McMahon | G01S 7/023 |
| 2018/0101239 A1 | 4/2018 | Yin et al. | |
| 2018/0164406 A1 * | 6/2018 | Culkin | G01S 13/582 |
| 2019/0293748 A1 | 9/2019 | Gulati et al. | |
| 2019/0317191 A1 | 10/2019 | Santra et al. | |
| 2019/0339358 A1 | 11/2019 | Rimini et al. | |
| 2019/0383904 A1 * | 12/2019 | Harrison | G01S 13/931 |
| 2019/0391247 A1 | 12/2019 | Gulati et al. | |
| 2020/0072941 A1 | 3/2020 | Jansen et al. | |
| 2020/0225317 A1 * | 7/2020 | Chen | G01S 7/415 |
| 2020/0326526 A1 * | 10/2020 | Yeh | G06V 20/69 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| DE | 102019202836 A1 | 9/2020 |
| EP | 1775600 A1 | 4/2007 |
| EP | 3339880 A1 * | 6/2018 |
| GB | 2247799 A | 3/1992 |
| JP | 2001174539 A | 6/2001 |
| JP | 2004198312 A | 7/2004 |
| JP | 2006234513 A | 9/2006 |

(56) References Cited

FOREIGN PATENT DOCUMENTS

| | | | |
|---|---|---|---|
| JP | 2008029025 A | 2/2008 | |
| JP | 2008089614 A | 4/2008 | |
| JP | 2009069124 A | 4/2009 | |
| JP | 2010048716 A | 3/2010 | |
| JP | 2011529181 A | 12/2011 | |
| JP | 2012112861 A | 6/2012 | |
| JP | 2013521508 A | 6/2013 | |
| JP | 2014055957 A | 3/2014 | |
| KR | 20090063166 A | 6/2009 | |
| KR | 20140082815 A | 7/2014 | |
| WO | 2007060069 A1 | 5/2007 | |
| WO | 2013009473 A2 | 1/2013 | |
| WO | 2016033361 A1 | 3/2016 | |
| WO | 2019215732 A1 | 11/2019 | |

OTHER PUBLICATIONS

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thornton, Charles E., et al., "Experimental Analysis of Reinforcement Learning Techniques for Spectrum Sharing Radar", IEEE International Radar Conference (RADAR), Apr. 28-30, 2020, 6 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wilder, Carol N., et al., "Respiratory patterns in infant cry," Canada Journal of Speech, Human Communication Winter, 1974-75, http://cjslpa.ca/files/1974_HumComm_Vol_01/No._03_2-60/Wilder_Baken_HumComm_1974.pdf, pp. 18-34.

Will, Christoph et al., "Advanced Template Matching Algorithm for Instantaneous Heartbeat Detection using Continuous Wave Radar Systems", ResearchGate, May 2017, 5 pages.

Will, Christoph et al., "Human Target Detection, Tracking, and Classification Using 24-GHz FMCW Radar", IEEE Sensors Journal, vol. 19, No. 17, Sep. 1, 2019, pp. 7283-7299.

Will, Christoph et al., "Local Pulse Wave Detection using Continuous Wave Radar Systems", IEEE Journal of Electromagnetics, RF and Microwaves in Medicine and Biology, Oct. 25, 2017, 9 pages.

Will, Christoph et al., "Radar-Based Heart Sound Detection", Scientific Reports, www.nature.com/scientificreports, Jul. 26, 2018, 15 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Devlin, Sam "Potential-Based Reward Shaping for Knowledge-Based, Multi-Agent Reinforcement Learning", Submitted for degree of Doctor of Philsophy, Department of Computer Science, Univeristy of New York, Jul. 2013, 112 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\$\mathbb{V}$ dooringalertsystems. com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gigie, Andrew et al., "Novel Approach for Vibration Detection Using Indented Radar", Progess in Electromagnetic Research C, vol. 87, pp. 147-162, Oct. 4, 2018.

Gouveia, Carolina et al., "A Review on Methods for Random Motion Detection and Compensation in Bio-Radar Systems", Sensors, MDPI, Jan. 31, 2019, 17 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Gu, Changzhan et al., "Deep Neural Network based Body Movement Cancellation for Doppler Radar Vital Sign Detection", IEEE MiTT-S International Wireless Symposium (IWS) May 19-22, 2019, 3 pages.

Gu, Changzhu "Short-Range Noncontact Sensors for Healthcare and Other Emerginng Applications: A Review", Sensors, MDPI, Jul. 26, 2016, 24 pages.

Gu, Changzhan et al., "From Tumor Targeting to Speed Monitoring", IEEE Microwave Magazine, ResearchGate, Jun. 2014, 11 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.

(56) References Cited

OTHER PUBLICATIONS

Immoreev, I. Ya. "Ultrawideband Radars: Features and Capabilities", Journal of Communications Technology and Electronics, ISSN: 1064-2269, vol. 54, No. 1, Feb. 8, 2009, pp. 1-26.
Inac, Ozgur et al., "A Phased Array RFIC with Built-In Self-Test Capabilities," IEEE Transactions on Microwave Theory and Techniques, vol. 60, No. 1, Jan. 2012, 10 pages.
Killedar, Abdulraheem "XWR1xxx Power Management Optimizations—Low Cost LC Filter Solution," Application Report SWRA577, Texas Instruments, Oct. 2017, 19 pages.
Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.
Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.
Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.
Li, Zheng et al., "Multi-Agent Deep Reinforcement Leanring based Spectrum Allocation for D2D Underlay Communications", IEEE Transactions on Vehicular Technology, vol. 69, Issue 2, Feb. 2020, 14 pages.
Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.
Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.
Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.
Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.
Li, Changzhi "Vital-sign monitoring on the go", Sensors news and views, www.nature.com/naturelectronics, Nature Electronics, vol. 2, Jun. 2019, 2 pages.
Lim, Soo-Chui et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.
Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Liu, Pengfei et al., "Cognitive Radar Using Reinforcement Learning in Automotive Applications", IEEE Electrical Engineering and Systems Science, Signal Processing, Apr. 24, 2019, 11 pages.
Liu, Pengfei et al., "Decentralized Automotive Radar Spectrum Allocation to Avoid Mutual Interference Using Reinforcement Learning", IEEE Electrical Engineering and Systems Science, Signal Processing, Jan. 7, 2020, 11 pages.
Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.
Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.
Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.
Mostov, K., et al., "Medical applications of shortwave FM radar: Remote monitoring of cardiac and respiratory motion", Am. Assoc. Phys. Med., 37(3), Mar. 2010, pp. 1332-1338.
Oguntala, G et al., "Indoor location identification technologies for real-time IoT-based applications: an inclusive survey", Elsevier Inc., http://hdl.handle.net/10454/16634, Oct. 2018, 42 pages.
Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.
Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.
Richards, Mark A., "Fundamentals of Radar Signal Processing," McGraw Hill Electronic Engineering, ISBN: 0-07-144474-2, Jun. 2005, 93 pages.
Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.
Santra, Avik et al., "Short-range multi-mode continuous-wave radar for vital sign measurement and imaging", ResearchGate, Conference Paper, Apr. 2018, 6 pages.
Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.
Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.
Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.
Stooke, Adam et al., "Decoupling Representation Learning from Reinforcement Learning", arXiv:2009.08319v1 [cs.LG], University of California, Berkeley, Sep. 13, 2020, 17 pages.

\* cited by examiner

RADAR INTERFERENCE MITIGATION

TECHNICAL FIELD

The present disclosure relates generally to an electronic system and method, and, in particular embodiments, to radar interference mitigation.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuits used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

Automotive radars may be used, for example, to support various technologies, such as advanced driver assistance systems (ADAS), adaptive cruise control (ACC), automated driving, and collision warning (CW). For example, a car may have a long-range radar (LRR) on its front and a short range radar (SRR) on its back. The LRR may provide a forward looking view to, e.g., detect objects within 250 m from the radar, and may be used for applications such as ACC and CMS. The SRR may provide a backward looking view to, e.g., detect objects within 30 m from the radar, and may be used for applications such as lane change assistance (LCA) and assisted parking. The LRR and SRR may operate in the same frequency range, e.g., between 76 GHz and 77 GHz.

SUMMARY

In accordance with an embodiment, a method for radar interference mitigation includes: transmitting a first plurality of radar signals using a radar, the first plurality of transmitted radar signals having a first set of radar signal parameter values, where each of the first set of radar signal parameter values corresponds to a parameter of a set of parameters; receiving, using the radar, a first plurality of reflected radar signals that correspond to the first plurality of transmitted radar signals; generating a radar image based on the first plurality of reflected radar signals; using a continuous reward function to generate a reward value based on the radar image; using a neural network to generate a second set of radar signal parameter values based on the reward value, where each of the second set of radar signal parameter values corresponds to a parameter of the set of parameters; and transmitting a second plurality of radar signals using the radar, the second plurality of transmitted radar signals having the second set of radar signal parameter values.

In accordance with an embodiment, a millimeter-wave radar system includes: a transmitting antenna configured to transmit a first plurality of radar signals having a first set of radar signal parameter values, where each of the first set of radar signal parameter values corresponds to a parameter of a set of parameters; a receiving antenna configured to receive a first plurality of reflected radar signals that correspond to the first plurality of transmitted radar signals; and a processing system configured to: generate a radar image based on the first plurality of reflected radar signals, use a continuous reward function to generate a reward value based on the radar image, and use a neural network to generate a second set of radar signal parameter values based on the reward value, where each of the second set of radar signal parameter values corresponds to a parameter of the set of parameters, where the transmitting antenna is configured to transmit a second plurality of radar signals having the second set of radar signal parameter values.

In accordance with an embodiment, a method for radar interference mitigation includes: transmitting a first plurality of radar signals using a millimeter-wave radar, the first plurality of transmitted radar signals having a first set of radar signal parameter values, where each of the first set of radar signal parameter values corresponds to a parameter of a set of parameters, and where the set of parameters includes waveform shape, chirp time, chirp bandwidth, and number of chirps per frame; receiving, using the millimeter-wave radar, a first plurality of reflected radar signals that correspond to the first plurality of transmitted radar signals; generating a range-Doppler image (RDI) or range-angle image (RAI) based on the first plurality of reflected radar signals; computing a signal-to-interference-plus-noise ratio (SINR) of the generated RDI or RAI; generating a reward value based on a magnitude of the computed SINR using a continuous reward function; using a neural network to generate a second set of radar signal parameter values based on the reward value, where each of the second set of radar signal parameter values corresponds to a parameter of the set of parameters; and transmitting a second plurality of radar signals using the millimeter-wave radar, the second plurality of transmitted radar signals having the second set of radar signal parameter values.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
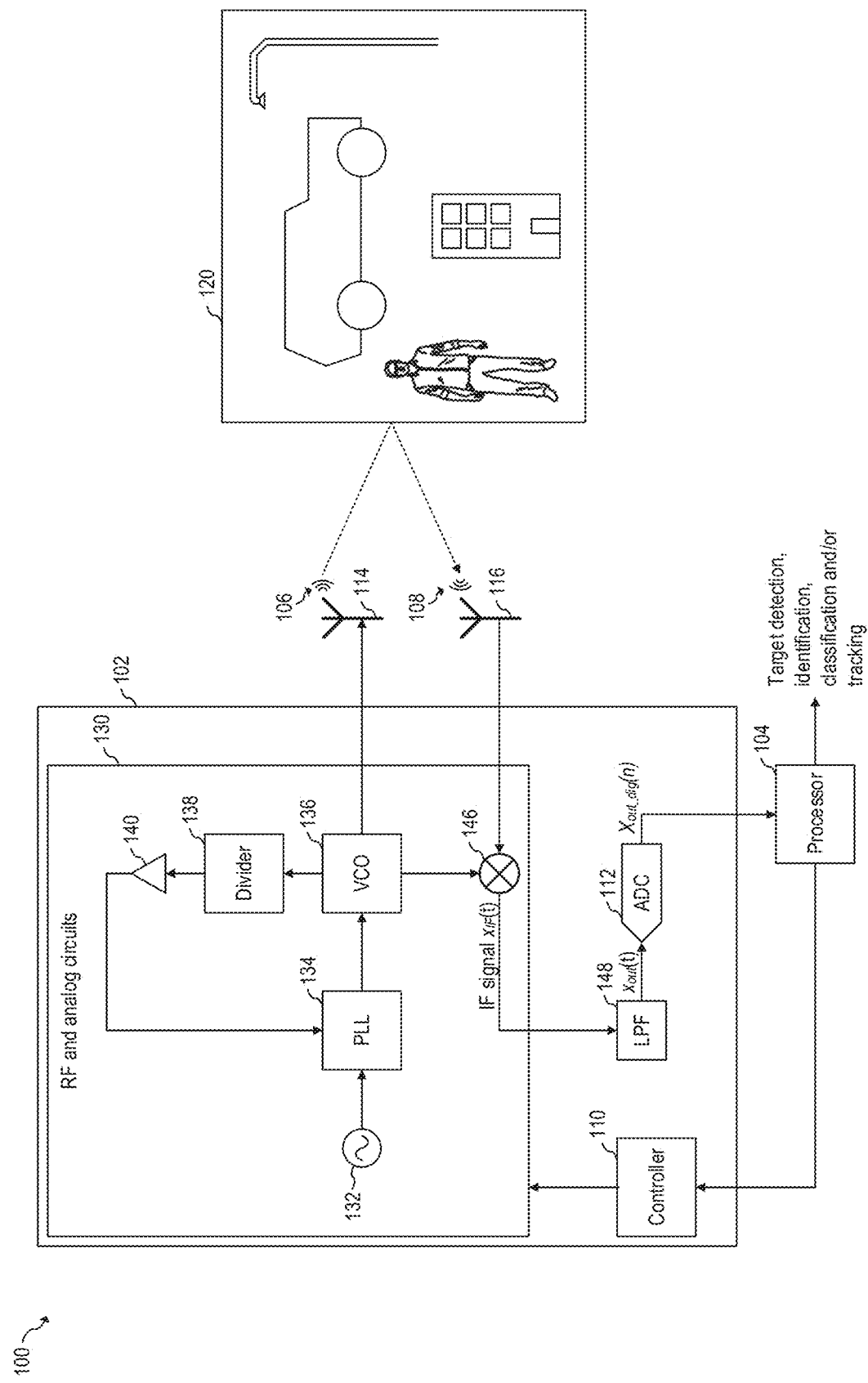
FIG. 1 shows a schematic diagram of a millimeter-wave radar system, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a circuit and method for automotive radar interference mitigation operating in the millimeter-wave (mmWave) regime. Embodiments of the present invention may be used for radar interference mitigation in applications different than automotive, such as industrial and airborne applications, as well as with frequencies outside the millimeter-wave regime. Some embodiments may also be used for interference mitigation in telecommunication applications, such as for wireless device-to-device (D2D) communication.

In an embodiment of the present invention, an automotive millimeter-wave radar reduces or eliminates interference caused by external RF sources (e.g., other nearby automotive millimeter-wave radars), by modifying one or more parameters of the transmitted (TX) radar signals to avoid such interference. A reward value is determined based on a radar image generated based on received radar signals. A neural network is used to determine the next set of parameters of the TX radar signals to maximize the reward value. In some embodiments, the reward value is based on a signal-to-interference-plus-noise ratio (SINR) value associated with the radar image, and the neural network generates the next set of TX radar signal parameters to maximize the SINR (e.g., of the next radar images to be generated). In some embodiments, the same radar images used to determine the reward value are also used to perform target detection, identification, classification, and/or tracking.

In some embodiments, the reward value is determined using a continuous reward function. By using a continuous reward function as opposed to a threshold-based reward function, some embodiments achieve continuous improvement, e.g., by detecting the amount of interference, generating the next set of parameters of the TX radar signals based on the magnitude of the reward, and prioritizing the optimization. For example, in some embodiments detecting the magnitude of the signal to interference ratio (SINR), the radar system is rewarded by computing different wave parameters (parameters associated with radar signals 106) which mitigate the highest sources of noise. This approach differs from the binary (threshold) rewards, which allow only two different states of interference, and therefore do not provide a feedback to the generated wave parameters about the reduction of interference obtained.

FIG. 1 shows a schematic diagram of millimeter-wave radar system 100, according to an embodiment of the present invention. Millimeter-wave radar system 100 includes millimeter-wave radar sensor 102 and processing system 104.

During normal operation, millimeter-wave radar sensor 102 operates as a frequency-modulated continuous-wave (FMCW) radar sensor and transmits a plurality of TX radar signals 106, such as chirps, towards scene 120 using transmitter (TX) antenna 114. The radar signals 106 are generated using RF and analog circuits 130. The radar signals 106 may be in the 20 GHz to 122 GHz range. In some embodiments, millimeter-wave radar sensor 102 operates as a phase-modulated continuous wave (PMCW) radar sensor.

The objects in scene 120 may include one or more static and moving objects. For example, in embodiments in which radar system 100 is implemented in a car, objects in scene 120 may include cars, motorcycles, bicycles, trucks, and other vehicles, idle and moving humans, street light poles, signs, and buildings and other types of structures. Other objects may also be present in scene 120.

The radar signals 106 are reflected by objects in scene 120. The reflected radar signals 108, which are also referred to as the echo signal, are received by receiver (RX) antenna 116. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers in ways known in the art to generate an analog signal $x_{out}(t)$.

The analog signal $x_{out}(t)$ is converted to raw digital data $x_{out\_dig}(n)$ using ADC 112. The raw digital data $x_{out\_dig}(n)$ is processed by processing system 104 to detect, identify, classify, and/or track one or more targets in scene 120. The output of processing system 104 may also be used (e.g., by a central controller of a car) to support advanced driver assistance systems (ADAS), adaptive cruise control (ACC), automated driving, collision warning (CW), and/or other automotive technologies.

Controller 110 controls one or more circuits of millimeter-wave radar sensor 102, such as RF and analog circuit 130 and/or ADC 112. As will be described in more detail later, controller 110 may (e.g., dynamically) change one or more parameters of the TX radar signals 106 and/or of the processing of the received reflected radar signals 108, based on an output of processing system 104, e.g., for purposes of interference mitigation.

Controller no may be implemented, e.g., as a custom digital or mixed signal circuit, for example. Controller no may also be implemented in other ways, such as using a general purpose processor or controller, for example. In some embodiments, processing system 104 implements a portion or all of controller 110.

Processing system 104 may be implemented with a general purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. Other implementations are also possible.

As a non-limiting example, RF and analog circuits 130 may be implemented, e.g., as shown in FIG. 1. During normal operation, VCO 136 generates a radar signal, such as a linear frequency chirp (e.g., from 57 GHz to 64 GHz, or from 76 GHz to 77 GHz), which is transmitted by transmitting antenna 114. The VCO 136 is controlled by PLL 134, which receives a reference clock signal (e.g., 80 MHz) from reference oscillator 132. PLL 134 is controlled by a loop that includes frequency divider 138 and amplifier 140.

The TX radar signal 106 transmitted by transmitting antenna 114 is reflected by objects in scene 120 and received by receiving antenna 116. The echo received by transmitting antenna 116 is mixed with a replica of the signal transmitted by transmitting antenna 114 using mixer 146 to reduce an intermediate frequency (IF) signal $x_{IF}(t)$ (also known as the beat signal). In some embodiments, the beat signal $x_{IF}(t)$ has a bandwidth between 10 kHz and 1 MHz. A beat signal $x_{IF}(t)$ with a bandwidth lower than 10 kHz or higher than 1 MHz is also possible.

The beat signal $x_{IF}(t)$ is filtered with low-pass filter (LPF) 148 and then sampled by ADC 112. ADC 112 is advantageously capable of sampling the filtered beat signal $x_{out}(t)$ with a sampling frequency that is much smaller than the frequency of the signal received by receiving antenna 116. Using FMCW radars, therefore, advantageously allows for a compact and low cost implementation of ADC 112, in some embodiments.

As will be described in more detail later, controller 110 may modify the sampling frequency, e.g., for purposes of interference mitigation.

The raw digital data $x_{out\_dig}(n)$, which in some embodiments is the digitized version of the filtered beat signal $x_{out}(t)$, is (e.g., temporarily) stored (e.g., in matrices of $N_c \times N_s$, where $N_c$ is the number of chirps considered in a frame and $N_s$ is the number of transmit samples per chirp) for further processing by processing system 104.

In some embodiments, ADC 112 is a 12-bit ADC. ADCs with higher resolution, such as 14-bits or higher, or with lower resolution, such as 10-bits, or lower, may also be used.

Figure 2:
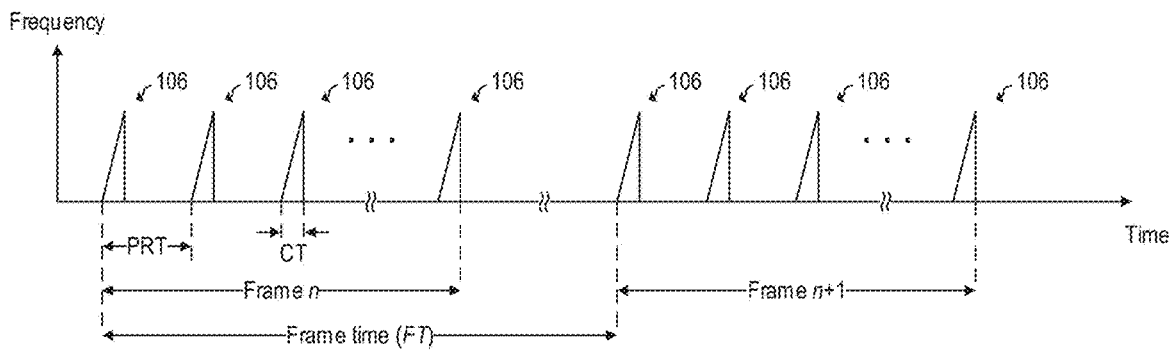
FIG. 2 shows a sequence of chirps transmitted by the transmitter (TX) antenna of the radar system of FIG. 1, according to an embodiment of the present invention.

FIG. 2 shows a sequence of chirps 106 transmitted by TX antenna 114, according to an embodiment of the present invention. As shown by FIG. 2, chirps 106 are organized in a plurality of frames and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106 (also referred to, generally, as pulses). For example, in some embodiments, the number of pulses in a frame is 16. Some embodiments may include more than 16 pulses per frame, such as 20 pulses, 32 pulses, or more, or less than 16 pulses per frame, such as 10 pulses, 8 pulses, 4 or less. In some embodiments, each frame includes only a single pulse.

Frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, or less, or more than 5 ms, such as 6 ms, or more.

The duration of the chirp (from start to finish) is generally referred to as chirp time (CT). In some embodiments, the chirp time may be, e.g., 64 µs. Higher chirp times, such as 128 µs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 102 may be, e.g., 1 MHz. Higher sampling frequencies, such as 2 MHz or higher, or lower sampling frequencies, such as 500 kHz or lower, may also be possible.

In some embodiments, the number of samples used to generate a chirp may be, e.g., 64 samples. A higher number of samples, such as 128 samples, or higher, or a lower number of samples, such as 32 samples or lower, may also be used.

Figure 3:
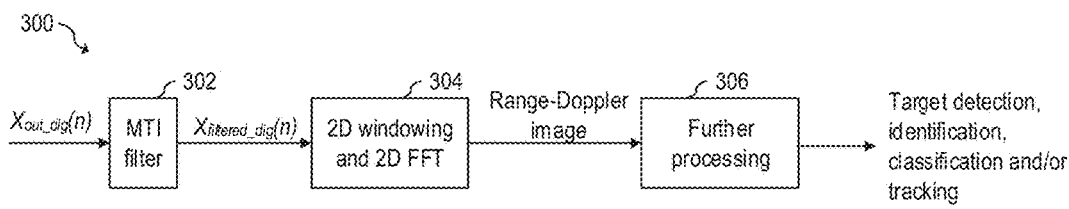
FIG. 3 shows a flow chart of an exemplary method for processing the raw digital data from the millimeter-wave radar sensor of FIG. 1.

FIG. 3 shows a flow chart of exemplary method 300 for processing the raw digital data $x_{out\_dig}(n)$ to, e.g., perform target detection, identification, classification, and/or tracking.

During step 302, a 1D moving target indication (MTI) filter is applied to the raw digital data $x_{out\_dig}(n)$ to remove the response from static targets (such as, e.g., chairs, tables and walls) and also of the transmitter-receiver leakage, which affects the first few range bins. The MTI filter may be performed by subtracting the mean along the fast-time (intra-chirp time) to remove the transmitter-receiver leakage that perturbs the first few range bins, followed by subtracting the mean along the slow-time (inter-chirp time) to remove the reflections from static objects (or zero-Doppler targets).

During step 304, 2D windowing is applied to the filtered digital data $x_{filtered\_dig}(n)$ along the fast-time as well as slow-time dimensions, followed by a 2D fast Fourier transform (FFT) to generate a 2D matrix representing the received energy spectrum over range and velocity, also known as range-Doppler image (RDI).

The RDI generated during step 304 is then further processed during step 306 to, e.g., perform target detection, identification, classification, and/or tracking. For example, further processing step 306 may include performing feature extraction to generate, e.g., RDI video or a Doppler spectrogram that may be used, e.g., to detect, identify, classify and track targets in ways known in the art, such as by using one or more of neural networks, Kalman filters, and other known radar processing techniques.

Although method 300 is described with respect to the generation of RDIs, other radar images may also be used, instead of, or in addition to RDIs, such as range-angle images (RAIs) and Doppler-angle images (DAIs). In some embodiments, other methods for generating the radar images may also be used. For example, in some embodiments, a neural network may be used to generate the radar images.

As will be described in more detail later, one or more parameters of the TX radar signals 106 may be dynamically adjusted, e.g., for purposes of interference mitigation. Example of parameters that may be dynamically modified include, the FMCW waveform shape (e.g., up-chirp, down-chirp, up-down chirp, down-up chirp), chirp time, chirp start/end frequency, chirp bandwidth, PRT, number of DAC samples, number of pulses (e.g., chirps) in a frame, IT, frame rate, frame start time, and TX radar signal transmit power.

In applications in which the spectrum is shared by more than one RF source, interference and congestion may result. For example, the use of automotive radar is on the rise. In most countries, the frequency range allocated for automotive radar is limited, and is, e.g., between 76 GHz and 77 GHz. As automotive radar adoption increases, cars implementing automotive radars are inevitably be near other cars implementing automotive radars. For example, a car implementing an automotive radar may be near another car implementing automotive radar that may be, e.g., static or moving, in the same or adjacent lanes, moving in the same, opposite, or different direction, and at the same or different velocities. When a radar receives an interference signal, the resulting interference can be potentially dangerous and bring safety drawbacks. For example, interference from another radar may result in the detection of ghost targets and/or failure to detect real targets.

Figure 4:
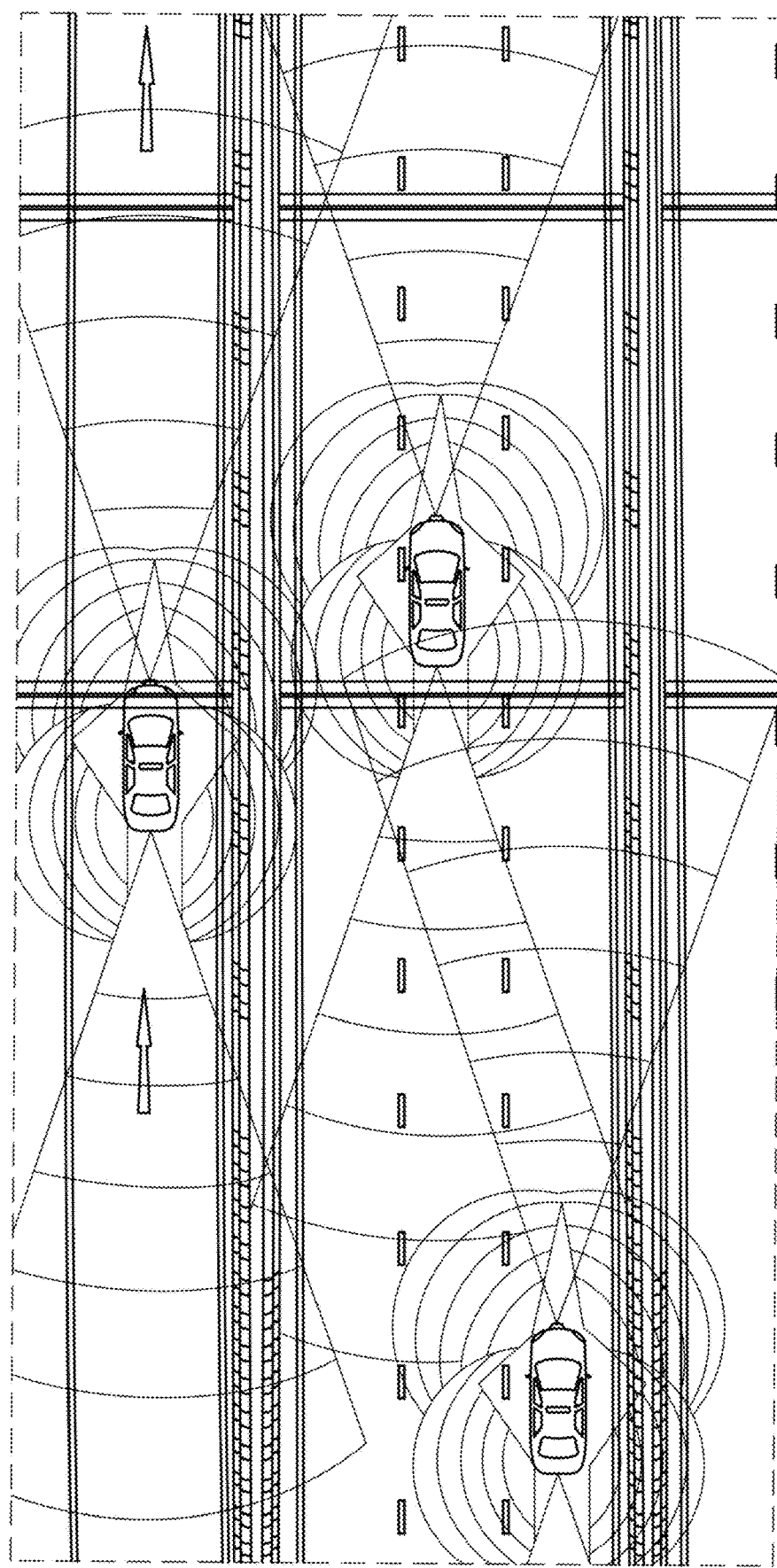
FIG. 4 shows an example of spectrum sharing by cars in a road.

FIG. 4 shows an example of spectrum sharing by cars in a road.

Solutions to mitigating automotive radar interference can be categorized as interference cancelling (IC) and interference avoidance (IA). Interference cancelling techniques aim to reduce or eliminate interference by processing the received signal. Interference avoidance aim to reduce or eliminate interference based on changing the transmitted signal, e.g., in the time domain, frequency domain, and/or space domain, such as by coordinating with other radars or RF sources.

Figure 5A:
FIG. 5A shows an example of interference between automotive radars respectively implemented in two cars.
Figure 5B:
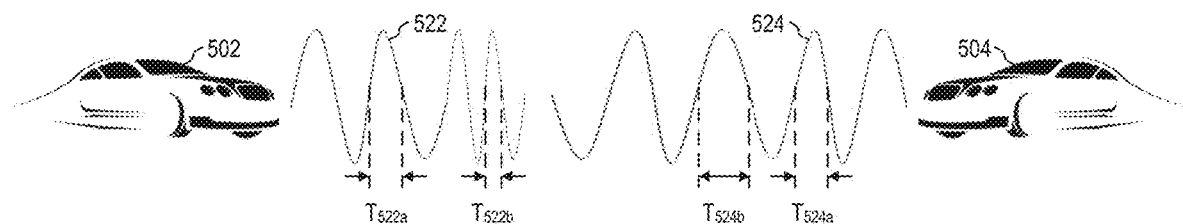
FIG. 5B shows an example of mitigating the automotive radar interference shown in FIG. 5A.

FIG. 5A shows an example of interference between automotive radars respectively implemented in cars 502 and 504. As shown in FIG. 5A, the periods $T_{522a}$ and $T_{524a}$ of TX radar signals 522 and 524 are the equal to each other. FIG. 5B shows an example of mitigating the automotive radar interference shown in FIG. 5A. As shown in FIG. 5B, the radar of car 502 may, e.g., increase its operating frequency, and/or the radar of car 504 may, e.g., decrease its operating frequency such that TX radar signals 522 and 524 operate in different frequency bands. Simultaneously modifying the frequency of the signals 522 and 524 in opposite directions may lead to a faster reduction in interference.

In an embodiment of the present invention, a decentralized multi-agent reinforcement learning (MARL) is used to implement interference avoidance to reduce or eliminate interference caused by the coexistence in the same space of multiple RF sources (e.g., multiple automotive radars). The setting (e.g., the characteristics of the space in which the automotive radars coexist) may only be partially observable by each agent (e.g., by each automotive radar). In some embodiments, each agent autonomously chooses the set of parameters of the next TX radar signals based on their respective observations of the environment by using, e.g., a reward value that, e.g., each agent respectively determines. In some embodiments, each agent (e.g., each automotive radar) preserves information over the past decisions (previous sets of TX radar signal parameters) using temporal modeling, such as by using a long short-term memory (LSTM) neural network or another type of recurrent neural network (RNN). The generation of the next set of TX radar signal parameter values is based on the trained neural network as well as on the stored past decisions of the particular agent. The agents may cooperate, e.g., by exchanging information of the current and future state of the agents using, e.g., a side communication channels and/or may be non-cooperative.

Reinforcement learning (RL) may be understood as a type of unsupervised machine learning in which an agent receives input(s) from the environment (e.g., reward values) from which the agent can infer whether the agent action(s) had positive or negative consequences (e.g., the agent moving closer or further away from the agent's goal). An agent, therefore, may learn how to satisfy its own motivation to achieve its own goal(s) through experience in the environment, e.g., by developing a policy $\pi$ to maximize its reward value.

Figure 6:
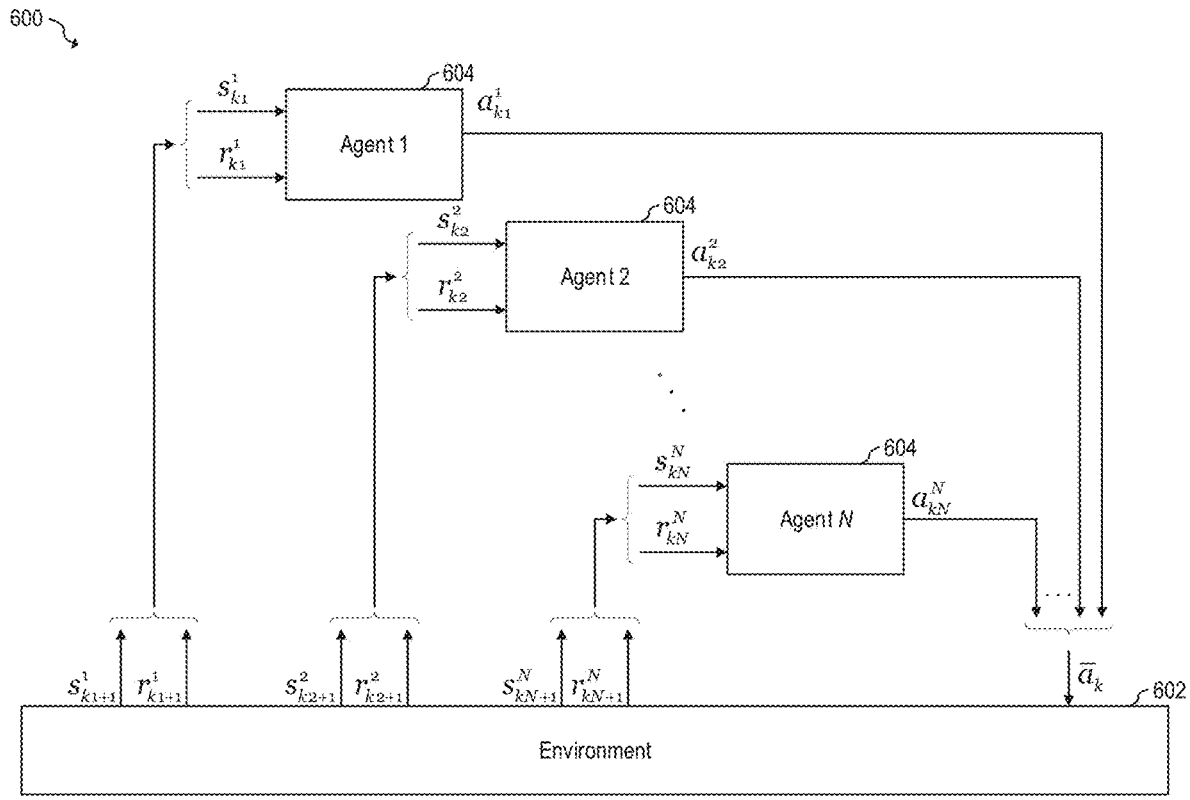
FIG. 6 shows an interaction model between a plurality of agents and the environment, according to an embodiment of the present invention.

FIG. 6 shows interaction model 600 between N agents 604 and an environment 602, according to an embodiment of the present invention. In FIG. 6, $s_{ki}^i$ represents the state of the environment 602 observable by agent i at time k, $r_{ki}^i$ r represents the reward value received by agent i at time k, and $a_{ki}^i$ represents the action taken by agent i at time k. N may be, e.g., a positive integer between 2 and 10. N may also be higher than 10, such as 15, 20, or higher.

An agent 604 may be implemented, e.g., by a vehicle (e.g., a car) having a millimeter-wave radar system (such as e.g., millimeter-wave radar system 100).

As shown in FIG. 6, the interactions between agents 604 and environment 602 is a cycle that begins with environment 602 presenting the current situation (in the form of state s and reward r) to agents 604, and, in response, agents 604 taking action a to modify the environment 602 according to their respective policies π (according to their respective motivations and goals). The cycle then repeats by the environment presenting a new situation to agents 604, where the new situation is based on the previous actions a of agents 604.

At each time step k, each agent 604 determines its respective action a, following a policy π that maps the state space s to the action space a. Using reinforcement learning, an agent 604 learns (e.g., during training), an optimal policy π that maximizes the reward that such agent 604 receives from environment 602.

It is understood that although FIG. 6 illustrate N agents 604 each having the same time step k, the decision making process between agents 604 may not be synchronized. In some embodiments, the time step k of each agent 604 is independent and may have the same or different time duration than the time steps of other agents in the environment 602. In some embodiments, some agents may operate with different policies (e.g., trying to achieve different goals and/or in a different manners), as well as other RF sources that may be non-dynamic (e.g., do not change their transmitted signal parameters based on environment 602.

In some embodiments, the setting in which agents 604 operate is non-cooperative (e.g., when the radar parameters of other interfering radars 604 are not known to a particular radar 604). In such embodiments, since each agent 604 operates independently and without communicating with other agents 604, the state space s of each agent 604 may be limited to, e.g., the radar parameters of such agent 604. In some embodiments, the state space s of an agent 604 includes one or more (or all) TX waveform parameters of such agent 604, such as the FMCW waveform shape (e.g., up-chirp, down-chirp, up-down chirp, down-up chirp), chirp time, chirp start/end frequency, chirp bandwidth, PRT, number of pulses in a frame, sampling frequency, FT, and TX radar signal transmit power. The action state a may include one or more (or all) TX waveforms parameters, such as the FMCW waveform shape (e.g., up-chirp, down-chirp, up-down chirp, down-up chirp), chirp time, chirp start/end frequency, chirp bandwidth, PRT, number of pulses in a frame, FT, and TX radar signal transmit power. In some embodiments, the state space s and the action space a are the same. In some embodiments, the action space a is a smaller subset of the state space s. For example, in some embodiments, the action space a includes the FMCW waveform shape, chirp time, chirp start/end frequency, chirp bandwidth, number of pulses in a frame, and sampling frequency, but may exclude PRT, FT, and TX radar signal transmit power (which may be present in the state space s).

The reward value r provides feedback to an agent 604, e.g., by rewarding or penalizing such agent 604 after the respective action a is taken. In some embodiments, the reward value r is determined based on the radar image(s) generated by millimeter-wave radar system 100. For example, in some embodiments, an SINR determined based on one or more radar images (such as RDI, RAI, and/or DAI) is used to determine the reward value. For example, the reflected radar signal 108 may be composed of the echo (from objects in scene 120), interference generated by other RF sources (such as by other agents 604), and noise (such as noise internal to the particular millimeter-wave radar or received from the environment 602). SINR may be given by $$SINR = \frac{P_r}{P_I + P_n} \quad (1)$$

where $P_r$ represents the power of the echo signal, $P_I$ represents the power of interference signal(s) generated by other RF sources, and $P_n$ represents the power of noise. As can be inferred from Equation 1, a higher SINR may advantageously minimize the probability of detecting ghost targets and failing to detect real targets (as well as errors in identification, classification, and/or tracking of targets) because of the presence of interference and noise.

In some embodiments, SINR is determined from a radar image, such as RDI, RAI or DAI. The reward value r is then determined as a number, e.g., proportional to the SINR. In some embodiments, choosing a reward value r that is based on SINR advantageously results in maximizing SINR when an agent 604 adopts a policy π to maximize the reward value. As can be inferred from Equation 1, maximizing SINR may also result in reducing or minimizing (thus avoiding) interference.

The SINR may be determined from the radar image itself by, e.g., using ordered statistics (OS) Constant False Alarm Rate (OS-CFAR) detector to determine the interference power and noise. For example, in some embodiments, an OS-CFAR detector may be used to determine SINR, e.g., by $$SINR = \frac{|S_{CUT}|^2}{\left(\frac{1}{N_{ref}}\right) \cdot \sum_{i=1}^{N_{ref}} |S_{ref}(i)|^2} \quad (2)$$

where CUT refers to the cell under test, where a target has been detected and indicates the signal power, $S_{CUT}$ is the signal at CUT, and ref refers to reference cells around the CUT that are used to compute the interference noise power in neighboring pixels. $N_{ref}$ refers to the number of reference cell chosen as dictated by the OS-CFAR detector. In some embodiments, millimeter-wave radar system 100 may listen (e.g., without transmitting any radar signals 106) to aid in the estimation of the interference power and noise. Other methods known in the art may be used to determine an SINR value associated with a radar image.

In some embodiments, other reward functions may be used. For example, signal-to-noise ratio (SNR), and interference-to-noise ratio (INR), based on radar images or raw or partially processed received radar signals, may also be used as reward functions.

Figure 7:
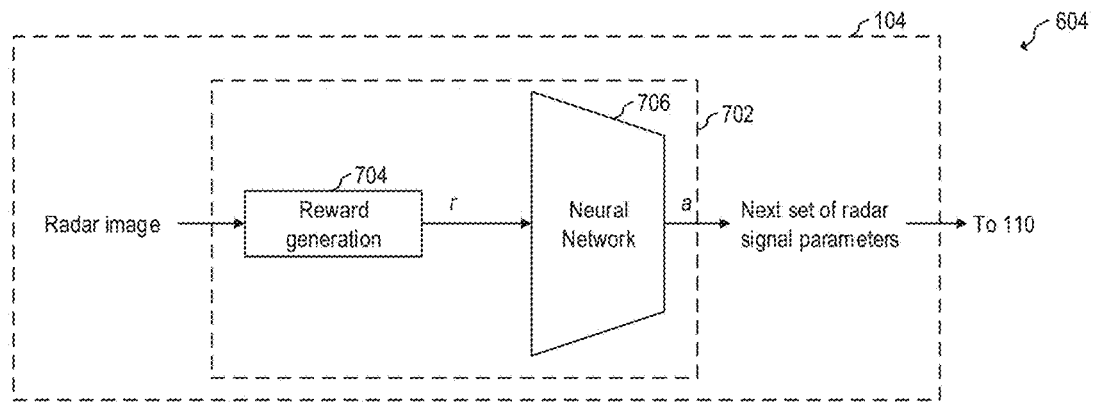
FIG. 7 shows a reinforcement learning (RL) controller of an agent of FIG. 6, according to an embodiment of the present invention.

FIG. 7 shows RL controller 702 of agent 604, according to an embodiment of the present invention. As shown in FIG. 7, RL controller 702 may be implemented inside processing system 104.

During normal operation, RL controller 702 receives a radar image, such as an RDI, RAI or DAI, which may be generated, e.g., as described in step 304. Reward generation module 704 then determines a reward value r based on the received radar image. For example, the reward value r may be equal to the magnitude of SINR, e.g., as computed using Equation 1. The reward value r may also be a scaled version, or offset version, or otherwise being based of the SINR value associated with the received radar image. For example, in some embodiments, the minimum reward value allowed is 0, where the reward value is more positive if the magnitude of the SINR is higher, and is less positive if the magnitude of the SINR is lower. In this way, the parameters of the waves (radar signals 106) are encouraged to change towards the maximization of the SINR. Other implementations are also possible.

In some embodiments, regard generation module 704 receives a plurality of images (e.g., RDI, RAI and/or DAI)

and generates the reward value r based on the plurality of images (e.g., such as an average SINR).

Neural network 706 receives the reward value r and then generates the next set of radar signal parameter values based on the magnitude of the reward value r. For example, in some embodiments, instead of using a threshold to determine whether the SINR value is acceptable or not and then take action based on whether the SINR value is higher or lower than the threshold, neural network 706 generates the next set of radar signal parameters a based on the magnitude of the reward value r (regardless of whether it is very high or very low) based on its learned policy π. By using a continuous reward function, therefore, some embodiments advantageously continuously reduce the amount of interference received by the millimeter-wave radar sensor 102, even in cases in which the amount of interference is already low. For example, several continuous rewards can be obtained utilizing the original SINR. Having a continuous reward simplifies the optimization problem, thus mapping different states and actions to a continuous reward space. In some embodiments, the continuous reward provides more informative directions on the wave parameter changes. In the setting of continuous rewards, for example, by computing polynomial transforms (e.g. $SINR^2$, etc.), low levels of SINR are penalized while high levels of SINR are rapidly increasing the reward. Using different transforms (e.g., polynomial, logarithmic, etc.) on the continuous reward, may determine a different behavior of the reward level r given the SINR.

In some embodiments, the speed of convergence (how fast the millimeter-wave radar system 100 reduces interference) is advantageously increased by using a continuous reward function as millimeter-wave radar system 100 may respond more strongly (modify more radar parameters by a larger amount) when the reward value r is very low (e.g., when SINR is very low).

Millimeter-wave radar sensor 102 then receives the new set of radar signal parameters from e.g., neural network 706, and modifies the parameters of the TX radar signals 106 based on the received new parameters, e.g., by using controller 110.

In some embodiments, neural network 706 implements a Q-network for Q-learning, RL setting. For example, neural network 706 may implement a Q function based on state s and action a. The Q function, thus provides a mapping from state space s to action space a based on the reward value r, where the Q function reflects the policy π (e.g., maximizing SINR). In some embodiments, neural network 706 may be implemented as a deep neural network, such as a deep convolutional neural network (CNN). For example, in some embodiments, neural network 706 may be implemented with a deep three-dimensional (3D) CNN. Some embodiments may be implemented using an RNN, such as by using an LSTM. Other implementations are also possible.

Figure 8:
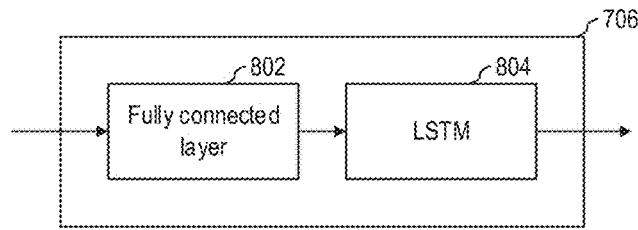
FIG. 8 shows a possible implementation of the neural network of FIG. 7, according to an embodiment of the present invention.

FIG. 8 shows a possible implementation of neural network 706, according to an embodiment of the present invention.

Figure 9:
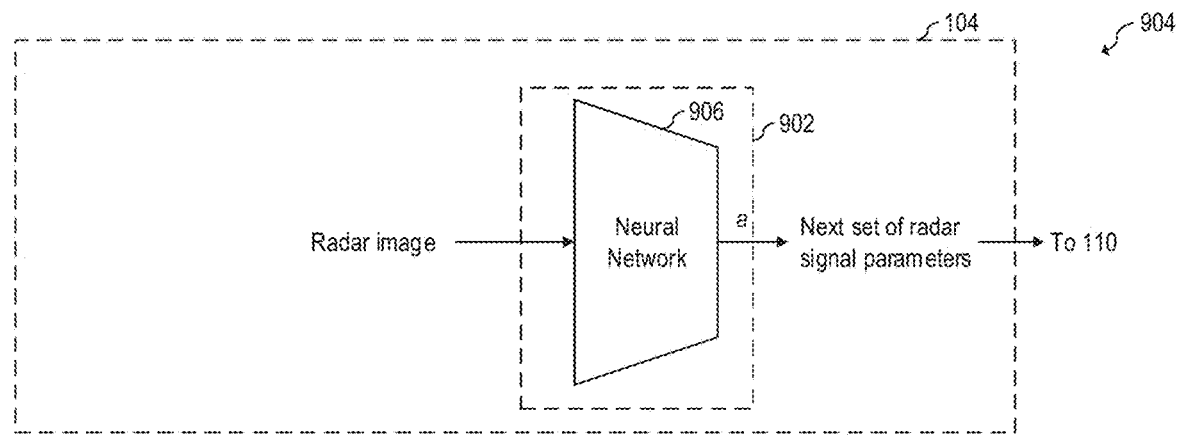
FIGS. 9-11 show RL controllers of an agent of FIG. 6, according to embodiments of the present invention.

In some embodiments, neural network 706 internally determines the value of the reward value r. For example, FIG. 9 shows RL controller 902 of agent 904, according to an embodiment of the present invention. Agent 604 may be implemented as agent 904.

As shown in FIG. 9, neural network 906 receives a radar image instead of receiving reward value r. Neural network 906 internally generates the reward value r and determines the next set of actions a based on the internally generated reward value r. For example, in some embodiments, being the reward a function dependent on the radar images, this mapping is directly learned by the neural network, and does not need to be calculated analytically each time.

In some embodiments, receiving the radar image with neural network 906 has the additional advantage of allowing neural network 906 to use additional information from the radar image to determine the next set of actions a (e.g., the next set of radar signal parameter values). For example, since interference generally decreases as the distance to the RF source producing the interference signal increases, in some embodiments, neural network 906 may use localization data (e.g., the location of detected targets, such range and/or angle) from the radar image (e.g., RDI, RAI and/or DAI), in addition to the reward value r (e.g., SINR, INR, SNR) to determine the next set of actions a. In some embodiments, neural network 906 may advantageously avoid interference faster than by relying solely on reward values r. In some embodiments, the localization data may modify the reward value r (may shape the reward value r), instead of being considered independently.

Neural network 906 may be implemented with an LSTM (e.g., as shown in FIG. 8), or another RNN, or with a CNN (e.g., such as a 3D CNN). Other implementations are also possible.

Figure 10:
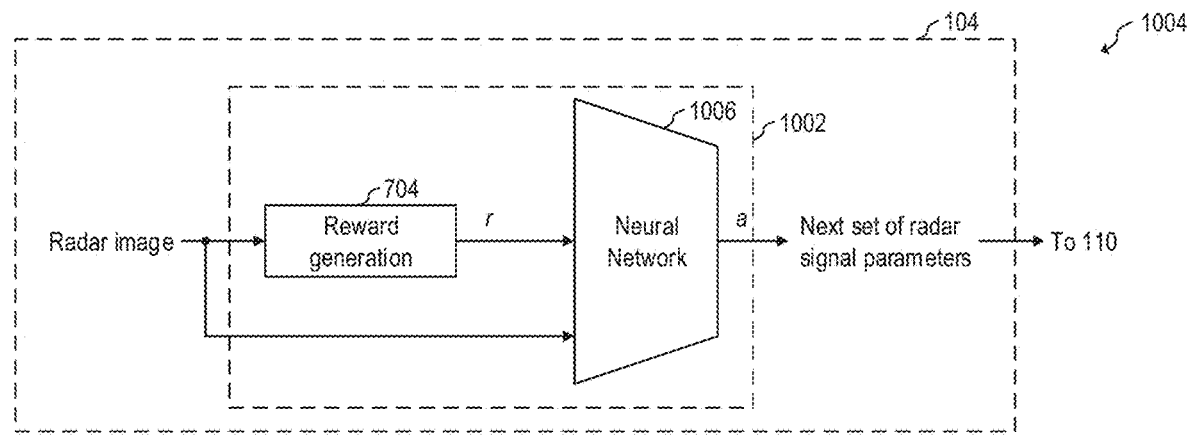

FIG. 10 shows RL controller 1002 of agent 1004, according to an embodiment of the present invention. Agent 604 may be implemented as agent 1004.

As shown in FIG. 10, neural network 906 receives a radar image in addition to receiving reward value r based on the radar image. Neural network 1006 determines the next set of actions a based on the received reward value r and the received radar image. For example, in some embodiments, the original SINR can be internally modified, e.g., transformed in a polynomial fashion, in order to generate the reward r. In some embodiments, such transformation establishes different relations between the SINR and the reward behavior.

Neural network 1006 may be implemented with an LSTM (e.g., as shown in FIG. 8) or another RNN, or with a CNN (e.g., such as a 3D CNN). Other implementations are also possible.

Figure 11:
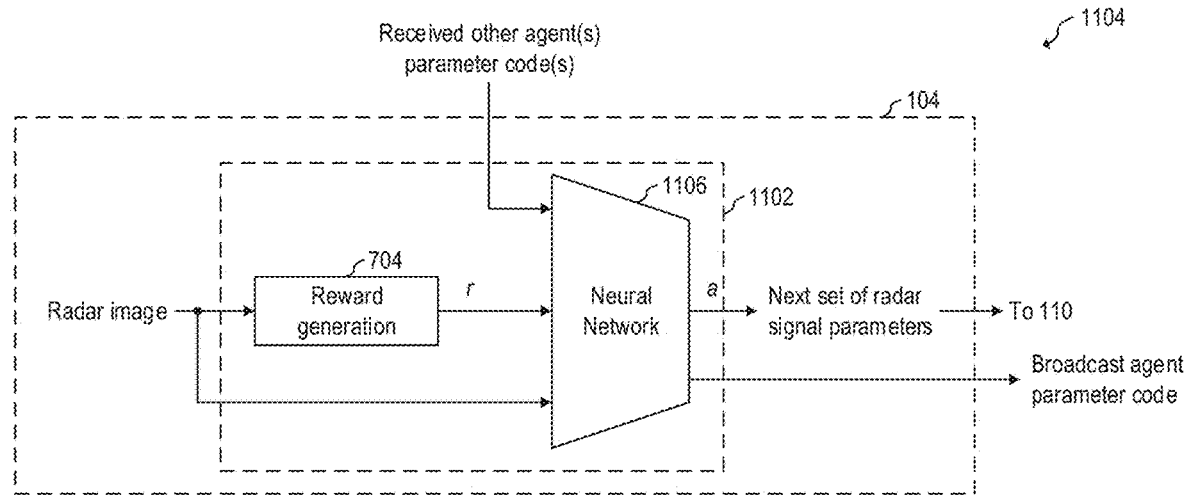

In some embodiments, some (or all) agents 604 cooperate by, e.g., sharing their current state (e.g., by sharing their TX radar signal parameters). Such shared information may be used to, e.g., more rapidly avoid interference. For example, FIG. 11 shows RL controller 1102 of agent 1104, according to an embodiment of the present invention. Agent 604 may be implemented as agent 1104.

As shown in FIG. 11, agent 1104 may broadcast, e.g., using a side communication channel (e.g., using a TX antenna separate from antenna 114) details about its current and/or next TX radar signal parameters, such as the FMCW waveform shape (e.g., up-chirp, down-chirp, up-down chirp, down-up chirp), chirp time, chirp start/end frequency, chirp bandwidth, PRT, number of pulses in a frame, FT, and TX radar signal transmit power. Such information may be used by other nearby agents 1104 to, e.g., allow for fast interference avoidance.

For example, as shown in FIG. 11, agent 1104 may receive respective parameter codes (codewords) from one or more nearby agents 1104, where the received parameter codes reflect the current and/or future TX radar signal parameters of such one or more respective nearby agents 1104. For example, a codeword may include information about the FMCW waveform shape (e.g., up-chirp, down-chirp, up-down chirp, down-up chirp), chirp time, chirp start/end frequency, chirp bandwidth, PRT, number of pulses in a frame, FT, and/or TX radar signal transmit power, for example. Neural network 1106, thus, may advantageously use such received parameter codes (e.g., in addition to the reward r and/or associated radar image) to generate the next set of radar signal parameters a.

Neural network 1106 may be implemented with an LSTM (e.g., as shown in FIG. 8), or another RNN, or with a CNN (e.g., such as a 3D CNN). Other implementations are also possible.

The side communication channel may be, e.g., WiFi, Bluetooth, a telecommunication technology (e.g., 5G NR, LTE, LTE-U, etc.) or any other vehicle-to-everything (V2X) communication protocol. Other communication channels may also be used.

Neural networks implementing RL may need to balance exploitation (performing actions that have shown, based on previous learning, that improve the reward value r) and exploration (trying new actions that may result in a worst reward value r). Exploitation generally results in the selection of actions a that improve subsequent reward values r. But without exploration, no learning may occur. In other words, exploration may be desirable for achieving successful exploitation. To balance exploration and exploitation, some embodiments use an ε-greedy method for action selection. Other methods, such as a greedy method and Boltzmann/soft-max method may also be used.

In some embodiments, neural networks 706, 906, 1006, and/or 1106, may be trained, e.g., in a centralized manner, with a balance between exploitation and exploration to learn or develop a policy π to maximize the reward value r. Once trained, the neural network (e.g., 706, 906, 1006, and/or 1106) may be deployed in a decentralized manner to one or more agents 606. In some embodiments, once deployed, the neural network (e.g., 706, 906, 1006, and/or 1106) may operate only in exploitation mode (without exploration). By avoiding exploration during deployment, some embodiments advantageously avoid instabilities that may be caused by a particular agent being exposed to unexpected environments. In other embodiments, the deployed neural networks continue to learn by balancing exploration and exploitation.

Figure 12:
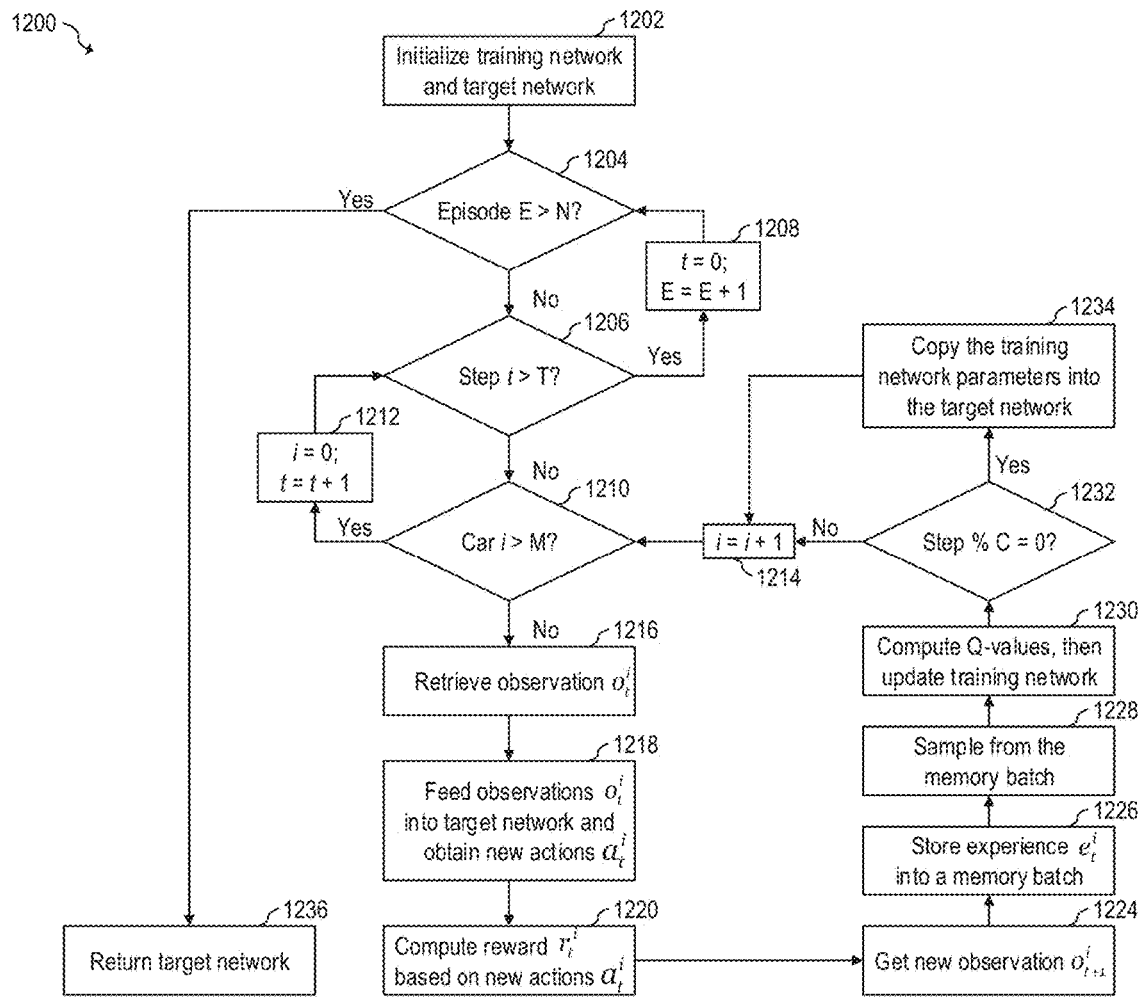
FIGS. 12 and 13 show flow charts of embodiment methods for training a neural network for interference mitigation, according to embodiments of the present invention.

FIG. 12 shows a flow chart of embodiment method 1200 for training a neural network (such as, e.g., 706, 906, 1006, or 1106) for interference mitigation, according to an embodiment of the present invention. Method 1200 trains, in a centralized manner, a target network based on N episodes involving M radars over time T. As shown in FIG. 12, the M radars lack full observability of the states and action of all other radars. The trained target network may then be deployed in a decentralized manner.

During step 1202, the target network (e.g., network 706, 906, 1006, or 1106) and a training network are initialized (e.g., the respective Q functions are initialized). In some embodiments, both the target network and the training network are initialized identically. In some embodiments, the initialization may be pessimistic (e.g., the values of all state-action pairs are set to the minimum possible value) or optimistically (e.g., the values of all state-action pairs are set to the maximum possible value). Some embodiments may initialize the target network and/or the training network in other ways, such as randomly.

As shown in FIG. 12, the training of the target network is performed by iterating over N episodes involving M radars over time T, as shown by steps 1204, 1206, 1208, 1210, 1212, and 1214. An episode refers to a succession of experiences starting from an initial state and ending after a certain number of steps. A step refers to a time step in which the neural network performs an update cycle (such as time step ki in FIG. 6).

As shown by steps 1204, 1206, 1208, 1210, 1212, and 1214, for each episode E, for each step t, and for each car i, steps 1216, 1218, 1220, 1224, 1226, 1228, 1230, 1232, and 1234 are performed.

During step 1216, a set of observations $o_t^i$ are retrieved. The set of observations $o_t^i$ may include, e.g., the last set of actions a taken by car i (e.g., such as the particular TX radar signal parameter values used), one or more radar images (e.g., such as RDI, RAI, and/or DAI) generated, e.g., by step 304 based on radar signals received at time t, the last reward received by car i (e.g., the SINR associated with the one or more radar images), and/or one or more parameter codes from one or more other agents 604.

During step 1218, the observations $o_t^i$ are fed into the target network, which then generates a new set of actions $a_t^i$. During step 1220, the reward value $r_t^i$ is computed based on the new set of actions $a_t^i$. For example, in some embodiments, computing the reward value $r_t^i$ involves generating a new radar image, and then generate the reward value $r_t^i$ based on the new radar image (e.g., by computing the SINR associated with the new radar image).

In some embodiments, the computed reward $r_t^i$ is obtained by using a continuous function instead of a function based on thresholds. In some embodiments, the continuous reward function may be implemented, e.g., in polynomial or exponential form, and provides continuous feedback rom the environment.

In some embodiments, a potential-based reward shaping function is used. For example, in some embodiments, the potential-based reward shaping function shapes the reward function based on the location of the agent 604 with respect to the other sources of interference, e.g., to speed-up the interference avoidance. For example, in some embodiments, the reward value r (e.g., computed based on SINR) is increased when the distance to the interference sources is higher (thus indicating that interference is being successfully avoided), and the reward value r is decreased when the distance to the interference sources is lower (thus causing the neural network to perform additional modifications to avoid interference that otherwise would if the reward value r was not modified based on the distance. Location information of the agent 604 and the other interference sources may be obtained, e.g., by using GPS, received codewords, and/or information from the radar images generated by the agent 604, such as localization data of detected targets.

During step 1224, a new set of observations $o_{t+1}^i$ is obtained. The new set of observations $o_{t+1}^i$ may include, e.g., the last set of actions a taken by car i (e.g., such as the particular TX radar signal parameter values used), one or more radar images (e.g., such as RDI, RAI, and/or DAI) generated, e.g., by step 304 based on radar signals received at time t, the last reward received by car i (e.g., the SINR associated with the one or more radar images), and/or one or more parameter codes from one or more other agents 604.

During step 1226, the experience $e_t^i$ is stored into a memory batch. The experience $e_t^i$ may include, for example, previous observation $o_t^i$, new observation $o_{t+1}^i$, action taken $a_t^i$, reward value $r_t^i$, and/or hidden state(s) (e.g., of an LSTM). The memory batch includes, e.g., a plurality of sequences of experiences e, where each sequence of experience e is difference (e.g., each sequence of experience is a random sequence based on the experiences stored in the memory batch). In some embodiments, only experiences from the last L episodes are stored, where L may be, e.g., 200. In some embodiments, L may be larger than 200, such as 300 or larger, or smaller than 200, such as 180, or smaller.

During step 1228, a sample is obtained from the memory buffer. For example, in some embodiments, in order to break the correlations of the observations during the training phase of the system, at each time step observations are stored in the memory buffer. During learning, a random mini-batch of observations is sampled from it and the system is trained with those samples for that time step.

During step 1230, new Q-values for the training network are computed based on the sampled experiences, and the policy π of the training network is updated.

As shown by steps 1232 and 1234, every C steps, the training network parameters are copied into the target network parameters. By updating the target network only every C steps, is less prone to variance in the training process. In some embodiments, C is a positive integer between 1 and 10. In some embodiments, C may be higher than 10, such as 20, 50, or higher.

Once the iteration over N episodes involving M radars over T steps is complete, the target network is fully trained, and is returned, e.g., for deployment, during step 1236.

In some embodiments, M may be a positive integer between 2 and 10. In some embodiments, M may be larger than 10, such as 12, 20, 32, or higher.

In some embodiments, the same trained target network is deployed in multiple cars.

In some embodiments, method 1200 generates M distinct trained target networks (one for each of the M cars). For example, in some embodiments, a copy of a training and target network for each car is stored, in a decentralized fashion. The training process then allows each car to train its own copy of the two networks, and each update on the network is realized on a partially observable system. No knowledge about networks, states or actions of other cars is required.

In some embodiments, the trained network implemented a trained Q function that maps the state space s to the action space a based on the magnitude of the reward value r. In other words, since the reward value r is the result of a applying a continuous function, the magnitude of the reward value r (e.g., together with the previous state s) may be used to determine in addition to which TX radar signal parameters to modify, the amount of modification of such parameters. For example, in some embodiments, a high reward value r may cause the trained neural network to perform only minor changes in one or a few parameters (e.g., changing the sampling frequency slightly), while a small reward value r may cause the neural network to perform more substantial changes in multiple parameters, such as changing the FMCW waveform shape, and substantially changing the chirp time and start frequency, and the number of pulses (e.g., chirps) in a frame, for example.

Figure 13:
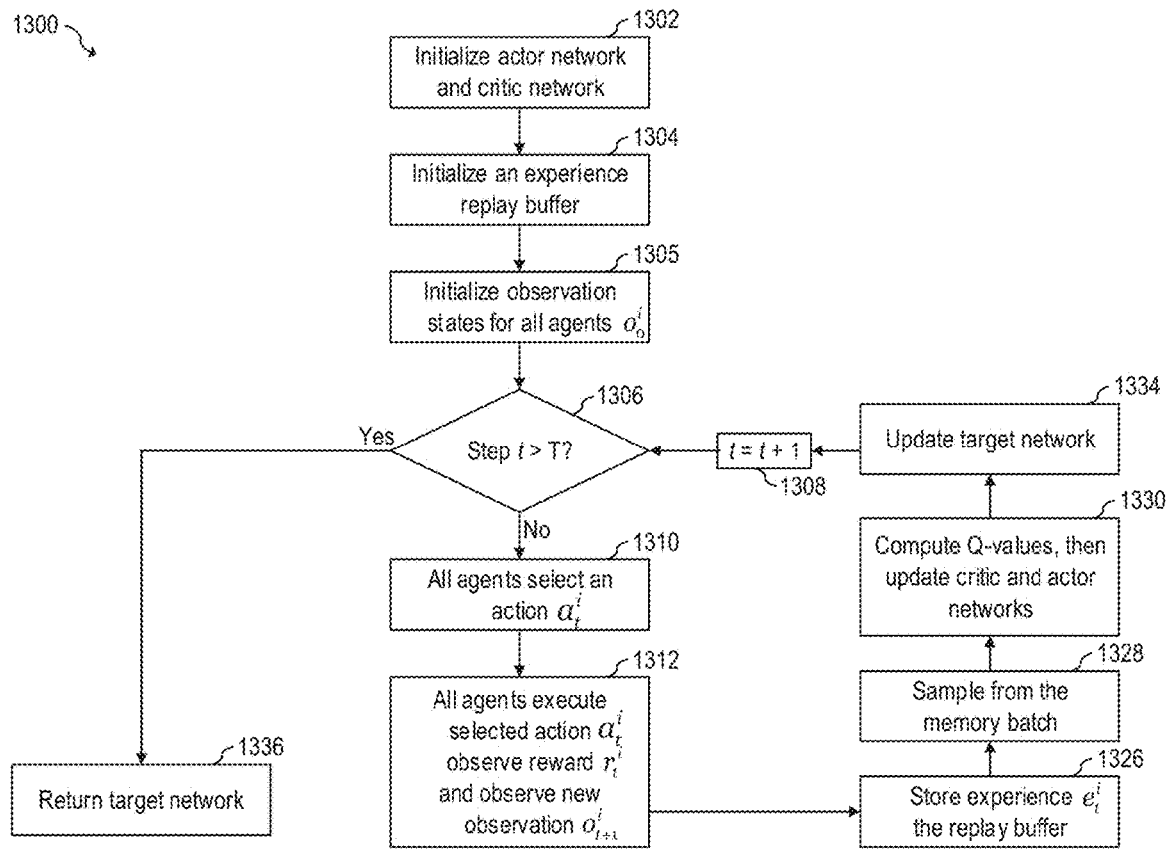

FIG. 13 shows a flow chart of embodiment method 1300 for training a neural network (such as, e.g., 706, 906, 1006, or 1106) for interference mitigation, according to an embodiment of the present invention. Method 1300 trains, in a centralized manner, a target network based interactions between M radars over time T, where each radar can observe states and actions from all radars.

During step 1302, actor networks (for generating actions based on observations for each radar) and critic networks (for evaluating the outcome of the actions taken by the actor networks) are initialized. In some embodiments, the actor networks may be implemented, e.g., with a neural network, such as, e.g., 706, 906, 1006, or 1106. In some embodiments, the critic networks may be implemented with one or more fully connected layers. Other implementations are also possible.

In some embodiments, the actor and critic networks may be randomly initialized. Other initialization mechanisms may also be used.

During step 1304, an experience replay buffer for storing experiences $e_t^i$ is initialized. The replay buffer may be implemented, e.g., as a matrix that randomly sequence of experiences in each row, e.g., in a similar manner as memory batch of FIG. 12.

During step 1305, initial observations $o_o^i$ for all radars i are provided.

As shown by steps 1306 and 1308, for each step t, steps 1310, 1312, 1326, 1328, 1330, 1332, and 1334 are performed.

During step 1310, all radars i select an action $a_t^i$ based on the current observation $o_t^i$ using their respective policies (e.g., as reflected by the actor networks). During step 1312, all agents execute their selected actions $a_t^i$, observe the resulting reward values $r_t^i$, and observe the resulting new observations $o_{t+1}^i$. Computing the reward values $r_t^i$ is based on the executed actions at and may be computed in a similar manner as in step 1218.

During step 1326, the experience $e_t^i$ for all radars i are stored into the replay buffer.

During step 1328, the replay buffer is sampled, e.g., in a similar manner as in step 1228.

During step 1330, new Q values are computed based on the sampled experiences, and the critic and actor networks are updated based on the new Q values. The actor network, for example, updates the parameters in the direction indicated by the critic, where the critic takes into account the Q values obtained utilizing states and actions of each car of the system.

During step 1334, the target network is updated based on the actor network.

Once the training is finished (after T steps), the target network is returned, e.g., for deployment, during step 1336.

Figure 14:
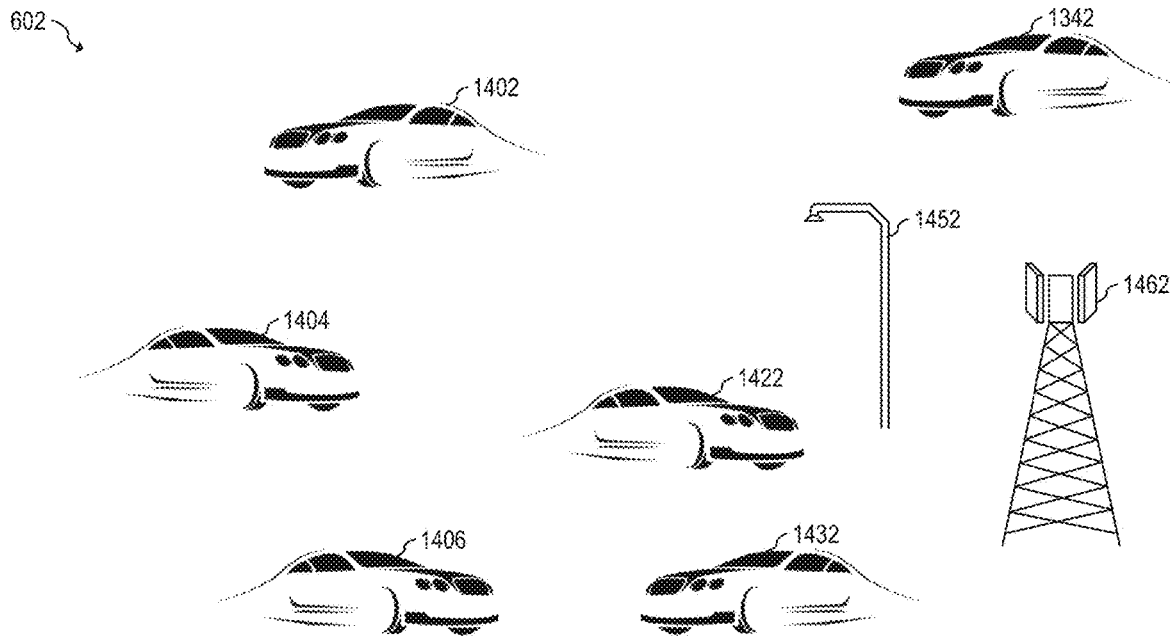
FIG. 14 shows a plurality of RF sources interacting in an environment, according to an embodiment of the present invention.

The trained target network obtained from steps 1236 or 1336 may be successfully implemented in one or more agents 606, which may interact with other RF sources that may or may not implement the same trained target network. For example, FIG. 14 shows a plurality of RF sources interacting in environment 602, according to an embodiment of the present invention. In this non-limiting example, cars 1402, 1404, and 1406 include a respective automotive radar systems (e.g., implemented as radar system 100, e.g., as SRR, and/or LRR) implementing a neural network (e.g., network 706, 906, 1006, and/or 1106) trained using methods 1200 and/or 1300. Car 1422 may include a WiFi source and no radar. Car 1432 may include an automotive radar without any interference mitigation system. Car 1442 may include an automotive radar which hops between different frequency sub-bands when the interference power is higher than a threshold. Street light 1452 may include a millimeter-wave radar, e.g., for detecting cars in a road. Telecommunication antenna 1462 may operate in accordance with, e.g., 5G NR, LTE, LTE-U, or other telecommunication technologies.

In the non-limiting example of FIG. 14, because, in part, of its independent, decentralized implementation/deployment, the radar system of car 1402 may successfully avoid interference from the radars of cars 1404 and 1406 (which may implement a similarly trained neural network for interference mitigation), as well as from cars 1422, 1432, and 1442, and from street light 1452 and telecommunication antenna 1462. In some embodiments, this is due to the radar system being exposed to differently generated and parametrized interference waves (radar signals) during training phase, and the behavior (the policy π) of the radar system is optimized towards a maximization of the SINR during such training phase. Thus, in some embodiments, interference mitigation is advantageously achieved by the effort by the radar of maximizing SINR even in the presence of RF sources that were not specifically used during the training phase.

Advantages of some embodiments include fast convergence for avoiding interference resulting from other nearby radars and other nearby RF sources. Some embodiments advantageously improve the radar performance (e.g., improve results from step 306) as a result of the interference reduction.

Figure 15:
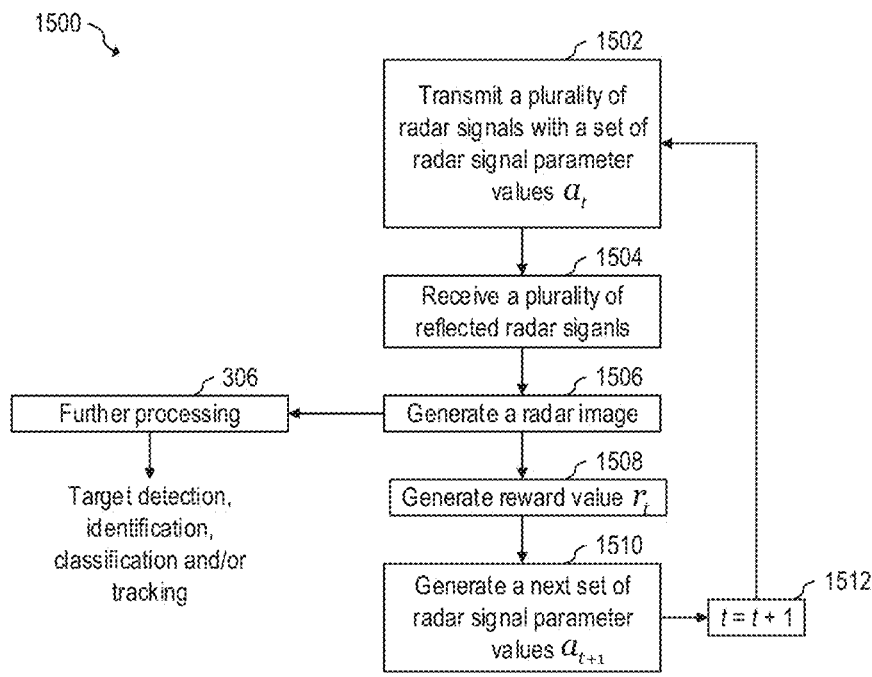
FIG. 15 shows a flow chart of an embodiment method for interference mitigation, and for radar signal processing, according to an embodiment of the present invention.

FIG. 15 shows a flow chart of embodiment method 1500 for interference mitigation, and for radar signal processing, according to an embodiment of the present invention. Method 1500 may be implemented by processing system 104 using a neural network, such as, e.g., 706, 906, 1006, or 1106, trained with, e.g., methods 1200 or 1300.

During step 1502, a radar system, such as millimeter-wave radar system 100, transmits a plurality of radar signals (e.g., 106), such as, e.g., one or more frames of chirps. The transmitted radar signals have a first set of radar signal parameter values $a_t$ corresponding to a set of parameters a. The set of possible parameters may include, e.g., FMCW waveform shape (e.g., up-chirp, down-chirp, up-down chirp, down-up chirp), chirp time (e.g., 64 µs, 128 µs), chirp start/end frequency, chirp bandwidth (e.g., 1 GHz, 4 GHz, 6 GHz), PRT, number of pulses in a frame (e.g., 4, 8, 16), FT, and TX radar signal transmit power.

During step 1504, the radar system receives a plurality of reflected radar signals (e.g., 108). In some embodiments, the set of parameters a also includes parameters associated with the processing of the reflected radar signals, such as the sampling frequency (e.g., 500 kHz, 1 MHz, 2 MHz).

During step 1506, the radar system generates a radar image, e.g., by processing the reflected radar signals, e.g., using millimeter-wave radar sensor 102, to generate raw digital data $x_{out\_dig}(n)$, and then processing the digital (e.g., using processing system 104) to generate the radar image (e.g., by performing steps 302 and 304).

The radar image may be further processed, e.g., using step 306.

During step 1508, a reward value $r_t$ is generated based on the radar image generated during step 1506 using a continuous reward function (e.g., similar or identical to the reward function using for computing the reward value during training methods 1200 or 1300).

During step 1510, a next set of radar signal parameter values $a_{t+1}$ is generated based on the reward value $r_t$ using a neural network (such as, e.g., 706, 906, 1006, and/or 1106).

As shown by step 1512, the cycle then repeats with step 1502 transmitting the next plurality of radar signals with the next set of radar signal parameter values $a_{t+1}$.

Figure 16:
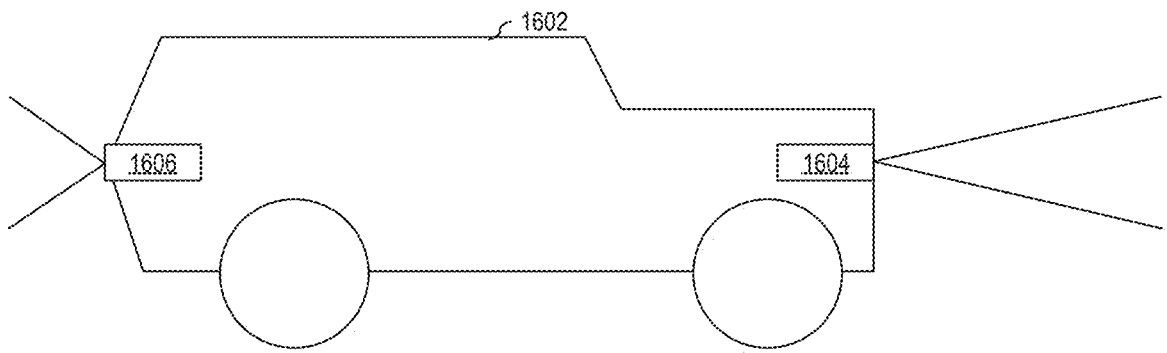
FIG. 16 shows a car, according to an embodiment of the present invention.

FIG. 16 shows car 1602, according to an embodiment of the present invention. Cars 1402, 1404 and/or 1406 may be implemented as car 1602.

Car 1602 includes long-range radar (LRR) 1604 on its front and a short range radar (SRR) 1606 on its back. Radars 1604 and 1606 may be implemented, e.g., as millimeter-wave radar system 100.

In some embodiments, the RL controller of each of 1604 and 1606 is the same (e.g., both are 702, 902, 1002, or 1102). In some embodiments, the RL controller of 1604 is different from 1606.

In some embodiments, both radar systems 1604 and 1606 are trained by the same method (e.g., 1200 or 1300). In some embodiments, each of radar systems 1604 and 1606 is trained by different methods (e.g., 1200 and 1300, respectively).

In some embodiments, car 1602 implements a single radar system (e.g., 1604 or 1606). In some embodiments, car 1602 implements more than two radar systems, such as three or more.

Example embodiments of the present invention are summarized here. Other embodiments can also be understood from the entirety of the specification and the claims filed herein.

Example 1. A method for radar interference mitigation, the method including: transmitting a first plurality of radar signals using a radar, the first plurality of transmitted radar signals having a first set of radar signal parameter values, where each of the first set of radar signal parameter values corresponds to a parameter of a set of parameters; receiving, using the radar, a first plurality of reflected radar signals that correspond to the first plurality of transmitted radar signals; generating a radar image based on the first plurality of reflected radar signals; using a continuous reward function to generate a reward value based on the radar image; using a neural network to generate a second set of radar signal parameter values based on the reward value, where each of the second set of radar signal parameter values corresponds to a parameter of the set of parameters; and transmitting a second plurality of radar signals using the radar, the second plurality of transmitted radar signals having the second set of radar signal parameter values.

Example 2. The method of example 1, where the reward value is a signal-to-interference-plus-noise ratio (SINR).

Example 3. The method of one of examples 1 or 2, where the set of parameters includes waveform shape, chirp time, center frequency, pulse repetition time, number of transmit samples per chirp, number of chirps in a frame, transmit power, and frame rate.

Example 4. The method of one of examples 1 to 3, further including receiving a codeword from a further radar, where generating the second set of radar signal parameter values based on the reward value includes generating the second set of radar signal parameter values based on the reward value and on the received codeword.

Example 5. The method of one of examples 1 to 4, further including receiving, with the neural network, the radar image.

Example 6. The method of one of examples 1 to 5, where generating the reward value includes generating the reward value based on localization data from the radar image.

Example 7. The method of one of examples 1 to 6, where the localization data includes range data of a target, where the target includes a further radar.

Example 8. The method of one of examples 1 to 7, where generating the reward value includes using the neural network.

Example 9. The method of one of examples 1 to 8, where the neural network is trained to maximize the reward value.

Example 10. The method of one of examples 1 to 9, where a minimum reward value is 0.

Example 11. The method of one of examples 1 to 10, further including training the neural network using a training data set that includes radar images from M radars, where M is a positive integer greater than 1.

Example 12. The method of one of examples 1 to 11, where M is less than 10.

Example 13. The method of one of examples 1 to 12, further including generating M different trained neural networks, where the M different trained neural networks includes the neural network.

Example 14. The method of one of examples 1 to 13, where the neural network includes a fully connected layer followed by a long short-term memory (LSTM) layer.

Example 15. The method of one of examples 1 to 14, where the neural network includes a three-dimensional convolutional neural network.

Example 16. The method of one of examples 1 to 15, where the radar image is a range-Doppler image (RDI).

Example 17. The method of one of examples 1 to 16, where the radar image is a range-angle image (RAI).

Example 18. The method of one of examples 1 to 17, where the radar is a millimeter-wave radar.

Example 19. A millimeter-wave radar system including: a transmitting antenna configured to transmit a first plurality of radar signals having a first set of radar signal parameter values, where each of the first set of radar signal parameter values corresponds to a parameter of a set of parameters; a receiving antenna configured to receive a first plurality of reflected radar signals that correspond to the first plurality of transmitted radar signals; and a processing system configured to: generate a radar image based on the first plurality of reflected radar signals, use a continuous reward function to generate a reward value based on the radar image, and use a neural network to generate a second set of radar signal parameter values based on the reward value, where each of the second set of radar signal parameter values corresponds to a parameter of the set of parameters, where the transmitting antenna is configured to transmit a second plurality of radar signals having the second set of radar signal parameter values.

Example 20. A method for radar interference mitigation, the method including: transmitting a first plurality of radar signals using a millimeter-wave radar, the first plurality of transmitted radar signals having a first set of radar signal parameter values, where each of the first set of radar signal parameter values corresponds to a parameter of a set of parameters, and where the set of parameters includes waveform shape, chirp time, chirp bandwidth, and number of chirps per frame; receiving, using the millimeter-wave radar, a first plurality of reflected radar signals that correspond to the first plurality of transmitted radar signals; generating a range-Doppler image (RDI) or range-angle image (RAI) based on the first plurality of reflected radar signals; computing a signal-to-interference-plus-noise ratio (SINR) of the generated RDI or RAI; generating a reward value based on a magnitude of the computed SINR using a continuous reward function; using a neural network to generate a second set of radar signal parameter values based on the reward value, where each of the second set of radar signal parameter values corresponds to a parameter of the set of parameters; and transmitting a second plurality of radar signals using the millimeter-wave radar, the second plurality of transmitted radar signals having the second set of radar signal parameter values.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for radar interference mitigation, the method comprising:
    transmitting a first plurality of radar signals using a radar, the first plurality of transmitted radar signals having a first set of radar signal parameter values, wherein each of the first set of radar signal parameter values corresponds to a parameter of a set of parameters, wherein the set of parameters comprises waveform shape, chirp time, chirp bandwidth, and number of chirps per frame;
    receiving, using the radar, a first plurality of reflected radar signals that correspond to the first plurality of transmitted radar signals;
    generating a radar image based on the first plurality of reflected radar signals, wherein generating the radar image comprises generating a range-Doppler image (RDI) or range-angle image (RAI) based on the first plurality of reflected radar signals;
    applying a continuous reward function to generate a reward value based on the radar image comprising computing a signal-to-interference-plus-noise ratio (SINR) of the generated RDI or RM, and generating the reward value based on a magnitude of the computed SINR;
    using a neural network to generate a second set of radar signal parameter values based on the reward value, wherein each of the second set of radar signal parameter values corresponds to the parameter of the set of parameters; and
    transmitting a second plurality of radar signals using the radar, the second plurality of transmitted radar signals having the second set of radar signal parameter values.

2. The method of claim 1, wherein the reward value is the SINR.

3. The method of claim 1, wherein the set of parameters further comprises center frequency, pulse repetition time, number of transmit samples used to generate each chirp, transmit power, and frame rate.

4. The method of claim 1, further comprising receiving a codeword from a further radar, wherein generating the second set of radar signal parameter values based on the reward value comprises generating the second set of radar signal parameter values based on the reward value and on the received codeword.

5. The method of claim 1, further comprising receiving, with the neural network, the radar image.

6. The method of claim 5, wherein generating the reward value comprises generating the reward value based on localization data from the radar image.

7. The method of claim 6, wherein the localization data comprises range data of a target, wherein the target comprises a further radar.

8. The method of claim 5, wherein generating the reward value comprises using the neural network.

9. The method of claim 1, wherein the neural network is trained to maximize the reward value.

10. The method of claim 1, wherein a minimum reward value is 0.

11. The method of claim 1, further comprising training the neural network using a training data set that comprises radar images from M radars, wherein M is a positive integer greater than 1.

12. The method of claim 11, wherein M is less than 10.

13. The method of claim 11, further comprising generating M different trained neural networks, wherein the M different trained neural networks comprises the neural network.

14. The method of claim 1, wherein the neural network comprises a fully connected layer followed by a long short-term memory (LSTM) layer.

15. The method of claim 1, wherein the neural network comprises a three-dimensional convolutional neural network.

16. The method of claim 1, wherein the radar image is the RDI.

17. The method of claim 1, wherein the radar image is the RAI.

18. The method of claim 1, wherein the radar is a millimeter-wave radar.

19. A millimeter-wave radar system comprising:
a transmitting antenna configured to transmit a first plurality of radar signals having a first set of radar signal parameter values, wherein each of the first set of radar signal parameter values corresponds to a parameter of a set of parameters, wherein the set of parameters comprises waveform shape, chirp time, chirp bandwidth, and number of chirps per frame;
a receiving antenna configured to receive a first plurality of reflected radar signals that correspond to the first plurality of transmitted radar signals; and
a processing system configured to:
generate a radar image based on the first plurality of reflected radar signals by generating a range-Doppler image RDI or range-angle image RAI based on the first plurality of reflected radar signals,
apply a continuous reward function to generate a reward value based on the radar image by computing a signal-to-interference-plus-noise ratio (SINR) of the generated RDI or RAI, and generating the reward value based on a magnitude of the computed SINR, and
use a neural network to generate a second set of radar signal parameter values based on the reward value, wherein each of the second set of radar signal parameter values corresponds to the parameter of the set of parameters, wherein the transmitting antenna is configured to transmit a second plurality of radar signals having the second set of radar signal parameter values.

20. A method for radar interference mitigation, the method comprising:
transmitting a first plurality of radar signals using a millimeter-wave radar, the first plurality of transmitted radar signals having a first set of radar signal parameter values, wherein each of the first set of radar signal parameter values corresponds to a parameter of a set of parameters, and wherein the set of parameters comprises waveform shape, chirp time, chirp bandwidth, and number of chirps per frame;
receiving, using the millimeter-wave radar, a first plurality of reflected radar signals that correspond to the first plurality of transmitted radar signals;
generating a range-Doppler image (RDI) or range-angle image (RAI) based on the first plurality of reflected radar signals;
computing a signal-to-interference-plus-noise ratio (SINR) of the generated RDI or RAI;
generating a reward value based on a magnitude of the computed SINR using a continuous reward function;
using a neural network to generate a second set of radar signal parameter values based on the reward value, wherein each of the second set of radar signal parameter values corresponds to the parameter of the set of parameters; and
transmitting a second plurality of radar signals using the millimeter-wave radar, the second plurality of transmitted radar signals having the second set of radar signal parameter values.

\* \* \* \* \*

UNITED STATES PATENT AND TRADEMARK OFFICE
CERTIFICATE OF CORRECTION

PATENT NO. : 11,614,511 B2
APPLICATION NO. : 17/024306
DATED : March 28, 2023
INVENTOR(S) : Lorenzo Servadei et al.

It is certified that error appears in the above-identified patent and that said Letters Patent is hereby corrected as shown below:

In the Claims

Claim 1, Column 20, Line 22; delete "RM" and insert --RAI--.

Signed and Sealed this
Twenty-ninth Day of August, 2023

Katherine Kelly Vidal
*Director of the United States Patent and Trademark Office*